US006955708B1

(12) United States Patent
Julos et al.

(10) Patent No.: US 6,955,708 B1
(45) Date of Patent: Oct. 18, 2005

(54) AIR-TREATMENT APPARATUS AND METHODS

(75) Inventors: John J. Julos, San Ramon, CA (US); Victor Dragotti, Danville, CA (US); Forwood Cloud Wiser, Kingston, NJ (US)

(73) Assignee: Shaklee Corporation, Pleasanton, CA (US)

( * ) Notice: Subject to any disclaimer, the term of this patent is extended or adjusted under 35 U.S.C. 154(b) by 0 days.

(21) Appl. No.: 11/005,850

(22) Filed: Dec. 6, 2004

Related U.S. Application Data

(60) Provisional application No. 60/601,594, filed on Aug. 13, 2004.

(51) Int. Cl.[7] .............................................. B03C 3/011
(52) U.S. Cl. ........................ 95/59; 95/69; 95/74; 96/16; 96/28; 96/57; 96/66; 96/97; 96/224; 422/24; 422/121; 422/186.3; 422/186.04
(58) Field of Search ................................ 96/16, 28, 57, 96/66, 68, 97, 224; 95/59, 69, 74; 422/24, 422/121, 186.3, 186.04

(56) References Cited

U.S. PATENT DOCUMENTS

| | | | | |
|---|---|---|---|---|
| 3,744,216 A | * | 7/1973 | Halloran ........................ | 96/16 |
| 3,804,942 A | * | 4/1974 | Kato et al. .................. | 423/239.1 |
| 3,956,458 A | * | 5/1976 | Anderson .................... | 423/210 |
| 4,244,710 A | * | 1/1981 | Burger .......................... | 95/69 |
| 4,597,781 A | * | 7/1986 | Spector ........................ | 96/52 |
| 4,828,586 A | * | 5/1989 | Joannou ........................ | 96/66 |
| 4,886,526 A | | 12/1989 | Joannou ........................ | 96/67 |
| 5,055,115 A | * | 10/1991 | Yikai et al. .................... | 96/59 |
| 5,108,470 A | | 4/1992 | Pick .............................. | 96/58 |
| 5,185,015 A | * | 2/1993 | Searle .......................... | 96/16 |
| 5,474,599 A | * | 12/1995 | Cheney et al. ................ | 96/55 |
| 5,486,410 A | | 1/1996 | Groeger et al. ............. | 442/353 |
| 5,573,577 A | * | 11/1996 | Joannou ........................ | 96/66 |
| 5,616,172 A | * | 4/1997 | Tuckerman et al. ........... | 96/16 |
| 5,656,063 A | * | 8/1997 | Hsu .............................. | 95/58 |
| 5,681,374 A | * | 10/1997 | Von Glehn .................... | 96/16 |
| 5,702,507 A | * | 12/1997 | Wang ............................ | 96/55 |
| 5,707,429 A | * | 1/1998 | Lewis ............................ | 96/63 |
| 5,807,425 A | * | 9/1998 | Gibbs .......................... | 96/66 |
| 5,837,207 A | * | 11/1998 | Summers .................... | 422/121 |
| 5,846,302 A | * | 12/1998 | Putro .......................... | 96/66 |

(Continued)

FOREIGN PATENT DOCUMENTS

JP 6-31201 * 2/1994 ..................... 96/57

Primary Examiner—Richard L. Chiesa
(74) Attorney, Agent, or Firm—Klarquist Sparkman LLP (57) ABSTRACT

Air-treatment apparatus and methods are disclosed that are especially suitable for treating the air in a room or other dwelling or working space. An apparatus embodiment of the subject apparatus includes a housing having air-intake and air-output openings. A gas-filter assembly inside the housing receives air entering the air-intake opening and includes a dual-media filter element having a matrix of fibers to which particles of activated carbon are adhered at mutual points of contact without using an extraneous binder. As air passes through the gas-filter assembly, the carbon particles adsorb odor compounds from the air. At least one electrostatic 3-dimensional (E3D) filter assembly downstream of the gas-filter assembly includes a respective charging element sandwiched between dielectric-fiber filters sandwiched between two respective electrically conductive screens. The screens are electrically grounded while the charging element (which is conductive) is connected to a source of high-voltage DC power. The resulting charges on fibers of the dielectric-fiber filters polarize and attract particles in air passing therethrough.

43 Claims, 5 Drawing Sheets

U.S. PATENT DOCUMENTS

| | | | |
|---|---|---|---|
| 6,036,738 A * | 3/2000 | Shanbrom | 55/524 |
| 6,053,968 A * | 4/2000 | Miller | 96/224 |
| 6,063,167 A * | 5/2000 | Rutkowski | 96/55 |
| 6,090,184 A * | 7/2000 | Cartellone | 95/69 |
| 6,149,717 A * | 11/2000 | Satyapal et al. | 96/16 |
| 6,322,614 B1 * | 11/2001 | Tillmans | 96/16 |
| 6,471,752 B1 * | 10/2002 | Lewis | 96/20 |
| 6,610,123 B2 * | 8/2003 | Wu et al. | 95/69 |
| 6,752,970 B2 | 6/2004 | Schwartz et al. | 422/186.3 |
| 6,764,533 B2 * | 7/2004 | Lobiondo, Jr. | 96/66 |
| 6,805,732 B1 * | 10/2004 | Billiotte et al. | 96/66 |
| 2003/0010211 A1 * | 1/2003 | Yu | 96/16 |

\* cited by examiner

AIR-TREATMENT APPARATUS AND METHODS

CROSS REFERENCE TO RELATED APPLICATION

This application claims the benefit of U.S. Provisional Patent Application No. 60/601,594, filed on Aug. 13, 2004.

FIELD

This disclosure pertains to apparatus and methods for treating air, typically air contained in an interior space such as one or more rooms of a dwelling, in a manner resulting in removal of undesired substances and particulates from the air.

BACKGROUND

Air treatment, i.e., any of various processes aimed at removing undesired substances from the air, is of great interest especially in human dwellings and workplaces. Attention to the quality of air in rooms and other spaces is increasing from research indicating that breathing purer air provides tangible health benefits. For example, many people live in or otherwise spend large amounts of time in single rooms or other relatively confined spaces in which the air available for breathing can become excessively laden over time with potentially harmful particulates, volatile compounds, and other contaminants. Also, with the increased emphasis on making living spaces and workspaces more environmentally tight, the air contained in such spaces can become more rapidly laden with levels of particulate and volatile contaminants that pose unacceptable health risks to the person or persons who occupy such spaces.

One conventional approach to air treatment is passing the air through a filter. For example, most residential forced-air heating units include a passive filter configured to remove larger, easily entrapped particulates such as pet hair and aggregates of lint and dust, principally for the purpose of protecting the heating equipment (e.g., the blower) from becoming overly burdened with accumulated debris from the air. Air passes through the filter whenever the heating unit is running. A disadvantage of this approach is that these filters have large interstitial spaces to ensure that the filter exhibits a very low pressure drop. As a result, these filters (while being better than no filter at all) are notoriously ineffective in capturing small particulates and volatile contaminants. If the pore size of these filters were reduced sufficiently to capture a large percentage (by count) of particulates in the air passing through the filter, then the filter would have too high a pressure drop (i.e., exhibit too high a flow resistance) to be usable with the forced-air heating unit. Also, filters having very small pore sizes are easily and rapidly clogged due to debris accumulation on upstream surfaces, which causes a rapid decline in the ability of the filters to pass air without having to apply a prohibitively high pressure gradient across the filter.

Another air-treatment approach involves passing the air through a region in which the air is ionized or subjected to generated electrons. This approach utilizes a source of electricity to produce an electrical charge in the region. The charge has sufficient amplitude to generate negative ions from the molecules of air gases exposed to the charge in the region. Particulate contaminants suspended in air, such as dust, smoke, and pollen, are usually made up of small, positively-charged particles. The generated negative ions combine with airborne positively charged particles and electrically neutralize them. The resulting neutral-charged particles fall to the earth or floor under the action of gravity. Thus, "ionized" air tends to reduce the concentration of suspended particles in the air. Unfortunately, most devices that produce ionized air also produce ozone, which has become generally recognized as an undesirable contaminant especially in room air. Ionizers also tend to overcharge airborne particles, thereby rendering them attractive to oppositely charged surfaces. This can result in an increased particulate accumulation on various surfaces in the room such as walls, furniture, and draperies.

Another known type of air treatment, called "photo-ionization," also produces ozone. In photo-ionization, the air is routed past a light source that produces ultraviolet light at a wavelength (about 185 nm) at which oxygen in the air is ionized to produce ozone. Ozone in sufficient concentration is an effective oxidizer of many types of organic compounds including the compounds that make up biological structures on microorganisms such as bacteria, algae, mildews, and molds. Thus, ozone destructively reacts with these microorganisms, which is effective especially in eliminating odors otherwise caused by them. Unfortunately, photo-ionization is not effective or at most poorly effective in physically removing fine particles such as soot, smoke, animal dander, and certain microorganisms from air. Also, as noted above, producing and discharging ozone into room air is not desirable.

Yet another known type of air treatment involves passing air through a gas-absorbing material such as granules of activated carbon (charcoal), wherein activated carbon is an effective adsorber of gaseous and certain molecular airborne contaminants. Conventional carbon gas-phase filters typically are configured for industrial use, and frequently exhibit any of various undesirable traits such as production of excessive amounts of carbon dust, and short service life. Reducing dust production can be achieved by attaching the granules of activated carbon to a matrix, but many such efforts tend to mask most of the surface of the carbon granules with adhesives or binders, which substantially reduces the effectiveness of the granules.

Hence, effective air treatment poses substantial challenges in the application of effective techniques. Whereas there have been various efforts to combine multiple air-treatment techniques in a single apparatus, these efforts heretofore have yielded disappointing results.

DETAILED DESCRIPTION

The subject apparatus and methods are described below in the context of representative embodiments that are not intended to be limiting in any way.

Figure 1A:
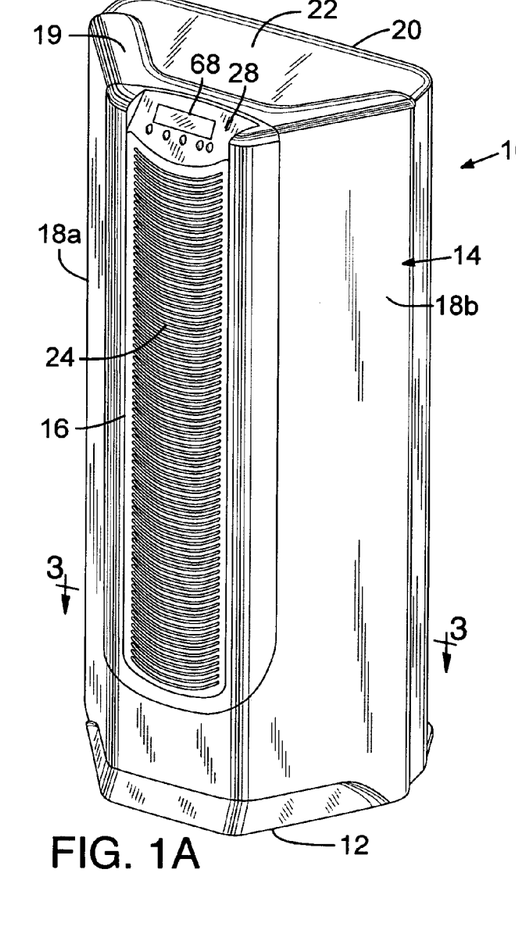
FIGS. 1A–1C are a perspective and two orthogonal views, respectively, of exterior features of a representative embodiment of an air-treatment unit.
Figure 1B:
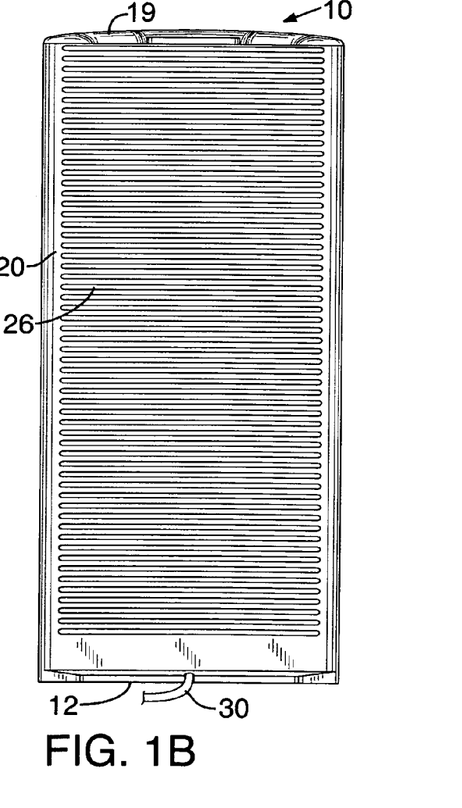
Figure 1C:
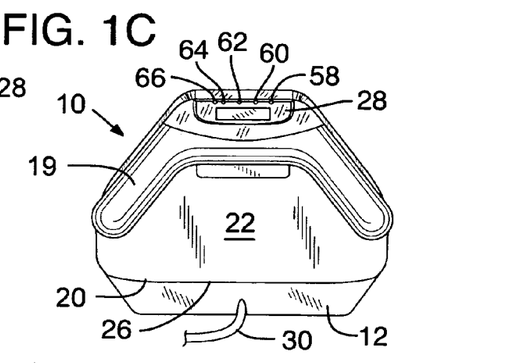

FIGS. 1A–1C depict general exterior aspects of a representative embodiment of an air-treatment unit 10. The depicted air-treatment unit 10 comprises a base 12 and a housing 14 extending vertically upward from the base 12. The housing 14 includes a front panel 16, side panels 18a, 18b, an intermediary portion 19, a rear panel 20, and a top surface 22. The front panel 16 defines an air-output grille 24, and the rear panel 20 (FIG. 1B) defines an air-intake grille 26. As seen in FIG. 1C, the housing 14 has a generally triangular profile transversely as a result of the particular manner in which filter assemblies, discussed in detail below, are disposed inside the housing 14 in this particular embodiment. The housing 14 also defines a control and display panel 28 adjacent the top surface 22. The control and display panel 28 desirably is sloped forwardly for ease of use by an operator. A power cord 30 enters the unit 10 from the rear or either side of the base 12. In this embodiment, and not intending to be limiting in any way, the housing is 36 inches high, 16 inches wide at the rear panel 20, and 10 inches deep.

Figure 2:
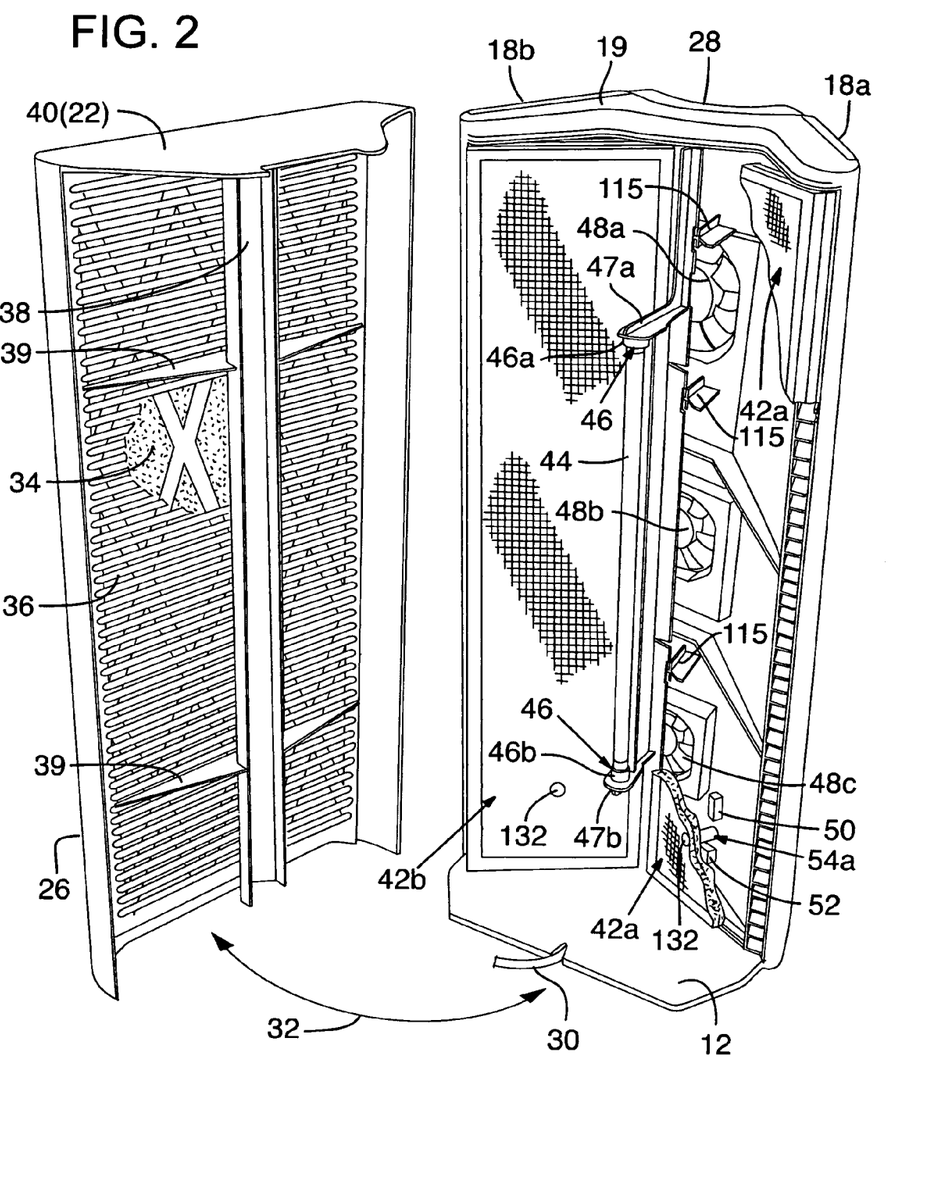
FIG. 2 is a perspective elevational view of the interior of the cabinet of the representative embodiment, with the rear panel shown swung away to the left.

Turning now to FIG. 2, and further with respect to the exemplary embodiment, certain assemblies and components mounted inside the housing 14 are shown. FIG. 2 shows the rear panel 20 opened and displaced to the left (arrow 32). As noted above, the rear panel 20 defines an air-intake grille 26 (FIG. 1(B)) that, in FIG. 2, is obscured by a gas-filter assembly 34 and inner louver panel 36. Also attached to the rear panel 20 inwardly of the inner louver panel 36 is a reflector strip 38 extending up the vertical midline of the louver panel 36 by which the gas-filter assembly is mounted to the rear panel 20. The reflector strip 38 is held by ribs 39, which also rigidify the louver panel 36. The rear panel has an extension 40 that becomes the top surface 22 when the housing 14 is closed up.

The right-hand portion of FIG. 2 depicts assemblies mounted on the inside surface of the intermediary portion 19 of the housing 14. These assemblies include a pair of electrostatic 3-dimensional ("E3D") filter assemblies 42a, 42b flanking a vertically disposed, ultraviolet (UV) lamp tube 44 mounted in a lamp socket 46. The lamp socket 46 comprises an upper portion 46a and a lower portion 46b that are mounted on respective arms 47a, 47b extending toward the rear panel 20 between the E3D filter assemblies 42a, 42b. Frontwardly of the UV lamp tube 44 and mounted in a vertically stacked manner on the intermediary portion 19 are three fans 48a–48c. Frontwardly of the E3D filter assembly 42a (and mounted to the intermediary portion 19) are a high-voltage transformer 50, a power electronics board 52, and a high-voltage probe 54a (a similar high-voltage probe 54b is situated frontwardly of the other E3D filter assembly 42b). During operation of the unit 10, the high-voltage transformer 50 supplies a high electrostatic potential via the respective probe 54a, 54b to the E3D filter assemblies 42a, 42b, as discussed in detail later below, and the UV lamp tube 44 irradiates UV light on the surfaces of the E3D filter assemblies (i.e., the upstream-facing surfaces) that face the UV lamp tube 44.

The air-treatment unit 10 desirably is run continuously during use, with the air-output grille 24 facing the area in a room or the like in which treated air is to be discharged. Because air enters the rear of the unit 10, the unit can be placed near a wall. In the depicted embodiment the base 12 has a slight flare to prevent the unit 10 from being placed with zero clearance against a wall.

The unit 10 will treat the air in a room or other space more quickly at higher fan speeds. Continuous operation is desirable because room air tends to acquire contaminants continuously, for example, by human and pet traffic into and out of the room, by other ventilation equipment discharging air into the room, around door frames and window frames, and through cracks and other imperfections in floors, walls, and ceiling. Also, particulate contamination and volatiles are continuously being added to the room air by the daily activity of the room occupant(s) and from furnishings and other things in the room. In addition, imparting movement to air in a dwelling structure can generate one or more areas of slightly negative pressure that pull air in through other openings such as vents, cracks, etc.

The unit 10 desirably is portable to allow movement to and placement at any of various locations where air cleaning is needed. Placing the unit 10 in a central location in a room or the like will provide clean air to surrounding locations in the room. The degree of cleaning will be greatest near the unit 10, with less-clean air generally existing at progressively greater distances from the unit. Any of various factors can affect these general performance parameters, such as air currents in the room, the configuration of the room (doors, windows, and walls), activity in the room, furnishings, etc.

Further with respect to the representative embodiment, air entering the unit 10 flows through the air-intake grille 26 and the gas-filter assembly 34, then flows through the E3D filter assemblies 42a, 42b as a germicidal wavelength of UV light from the UV lamp tube 44 irradiates the surfaces of the E3D filter assemblies 42a, 42b. The resulting purified air then passes through the fans 48a–48c and through the air-output grille 24 in the front panel 16 back into the room. Because the fans 48a–48c are located downstream of the gas-filter assembly 34 and E3D filter assemblies 42a, 42b, particle accumulation on the fans is minimized. Also, the action of the gas-phase filter 34 on air passing through the unit 10 keeps the UV lamp tube 44 and E3D filter assemblies clean.

The fans 48a–48c desirably run continuously so long as the unit 10 is on. Running of the fans 48a–48c creates a reduced pressure inside the housing 14, which draws air into the unit through the air-intake grille 26 in the rear panel 20. In a particular embodiment the fans 48a–48c have five selectable speeds (discussed later below) to suit a user's preference in terms of air-movement velocity in the room.

An exemplary UV lamp tube is a 25-Watt germicidal UV lamp tube, type TUV25, manufactured by Phillips. The UV lamp tube 44 is powered by a lamp-driving circuit (as known in the art) on the power electronics board 52, and desirably is illuminated continuously so long as the unit 10 is running. The UV lamp tube 44 produces UV light at a germicidal wavelength suitable for killing microorganisms such as bacteria and fungi (molds) in air near the tube and that become lodged on the surfaces of the E3D filter assemblies 42a, 42b facing the UV lamp tube 44. In this regard, a particularly desirable wavelength of UV light is 254 nm. The UV lamp tube 44 desirably does not produce ozone-generating wavelengths of UV light, such as 185-nm light (185-nm UV light splits molecular oxygen to form ozone). To such end, a particularly advantageous UV lamp tube 44 is made with a quartz tube doped to block transmission of 185-nm light while remaining transmissive to 254-nm light. Consequently, production of significant amounts of ozone by the unit 10 is prevented. As noted above, although the light produced by the UV lamp tube 44 can kill microorganisms in air near (i.e., passing by) the tube, the exposure time of microorganisms in air passing by the tube is usually very short. In contrast, the exposure time of microorganisms lodged on the facing surfaces of the E3D filter assemblies 42a, 42b is very long (potentially unlimited), which ensures thorough killing of the lodged microorganisms.

Figure 3:
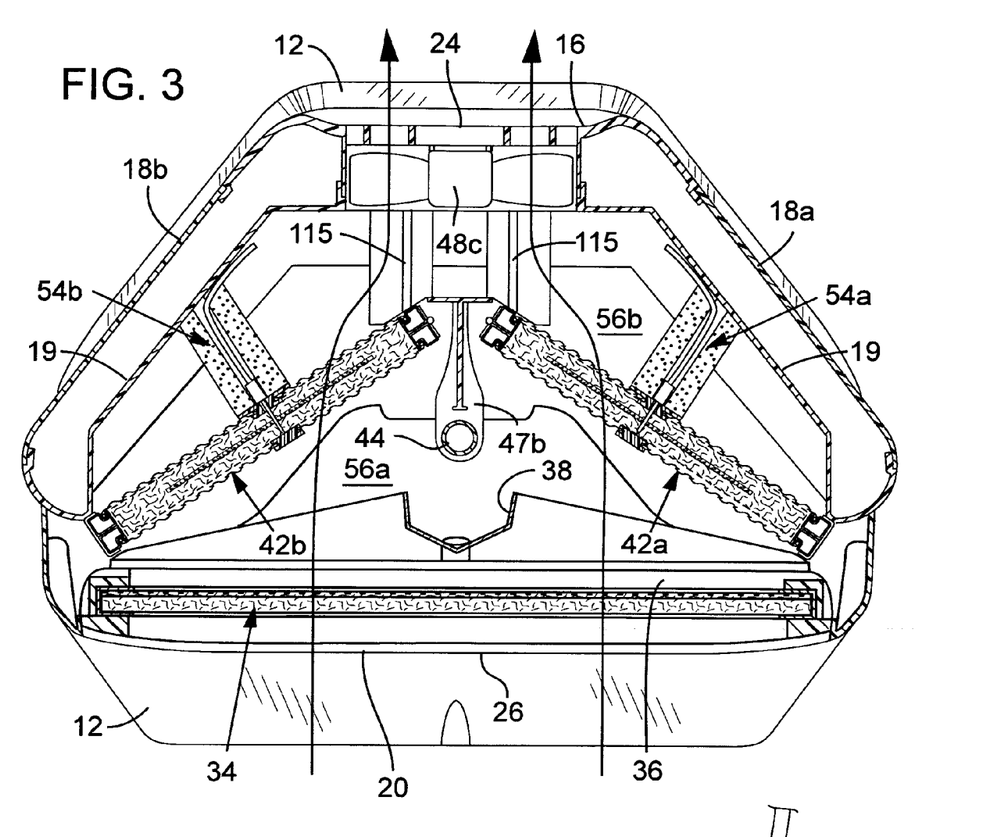
FIG. 3 is a transverse section along the line indicated in FIG. 1A.

Referring now to FIG. 3, a transverse section through the housing 14 of the representative embodiment is shown. The sectioned portions of the housing 14 include the intermediary portion 19, the front panel 16, the side panels 18a, 18b, and the rear panel 20. Shown also are spatial relationships of the air-intake grille 26, the gas-filter assembly 34, the louver panel 36, the reflector strip 38, the UV lamp tube 44, the lamp socket 46, the E3D filter assemblies 42a, 42b, the fans 48a–48c, and the air-output grille 24. Air passing through the gas-filter assembly 34 enters a first space 56a situated between the louver panel 36 and the E3D filter assemblies 42a, 42b mounted to the intermediary portion 19. While the air passes through the first space 56a, the air is exposed to the UV light produced by the lamp tube 44 and thus experiences some disinfection by the UV light. The air then passes through the E3D filter assemblies 42a, 42b and enters a second space 56b situated between the E3D filter assemblies and the side panels 18a, 18b and front panel 16 as the air moves toward the fans 48a–48c. Air passing through the fans 48a–48c passes out of the unit 10 through the air-output grille 24 in the front panel 16. As shown in FIG. 2, the second space 56b accommodates the high-voltage transformer 50 and the power-electronics board 52 mounted to the intermediary portion 19.

The gas-filter assembly 34 and E3D filter assemblies 42a, 42b desirably are mounted inside the housing 14 in a manner allowing easy replacement of the respective filters. The usable lifetime of these filters is a function of the degree of contamination of air in the space to be treated using the unit 10. In a space in which the contaminant load of the air is heavier than normal (e.g., particles, gases, and/or odors), the filters may need replacement more frequently than normal. By way of example, certain specific filters should be replaced after 6 months (approximately 4400 hours) of continuous use.

Similarly, the UV lamp tube 44 has a useful lifetime and desirably is mounted for ease of replacement as required. For example, to ensure optimum germicidal activity of the UV light, it is desirable to replace a particular UV lamp every year (approximately 8800 hours) of continuous use, even though the UV lamp tube 44 likely will illuminate for a longer period before burning out.

Figure 9:
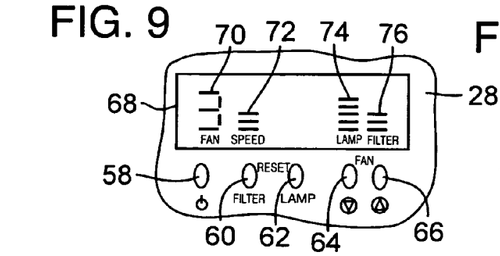
FIG. 9 depicts details of the control and display panel.

Turning now to FIG. 9, the control and display panel 28 in the depicted embodiment includes a power on-off push-button switch 58, a reset push-button switch 60 for the filter-replacement clock, a reset push-button switch 62 for the UV lamp-replacement clock, a fan-speed-decrease push-button switch 64, and a fan-speed-increase push-button switch 66. The control and display panel 28 also includes a display 68, which can be a liquid-crystal display (LCD). The display 68 illustrates fan speed with a numerical indication 70 (with "1" corresponding to the slowest fan speed and "5" corresponding to the fastest fan speed) and with a bar graph 72. The display 68 also includes a bar graph 74 indicating remaining useful lamp life, and bar graph 76 indicating remaining useful filter life. In each bar graph 74, 76, each displayed bar represents an available 20% of the life of the respective component. For example, a display of two bars indicates that approximately 40% of the useful life remains for the respective component. Thus, the bar graphs 74, 76 provide continuous feedback to the operator on the remaining lives of the respective components, which allows the operator to predict accurately when replacement of the respective components should be performed. On a particular bar graph, when the last bar is no longer displayed, a "Replace" message is displayed on the display 68. Upon replacing the respective component (lamp or filters), the respective push-button switch 60, 62 is depressed for five seconds to reset the respective replacement clock. Upon actuating any of the push-button switches 58, 60, 62, 64, 66, the display 68 will become back-lit and will remain so for 30 seconds if no other push-button switches on the unit are pressed. The display 68 also includes an LED indicator light (not shown) that remains illuminated so long as the unit 10 is plugged in to a source of household current.

Gas-Filter Assembly

Figure 4A:
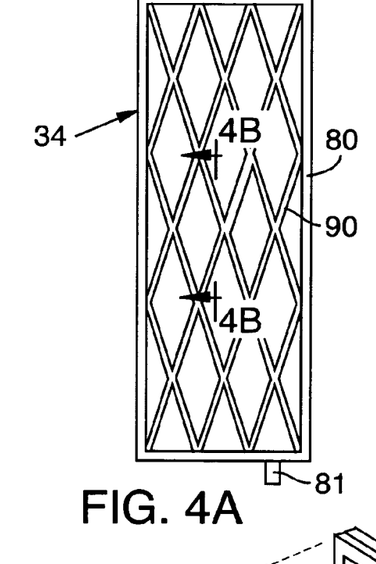
FIG. 4A is an elevational side view of a gas-filter assembly.
Figure 4B:
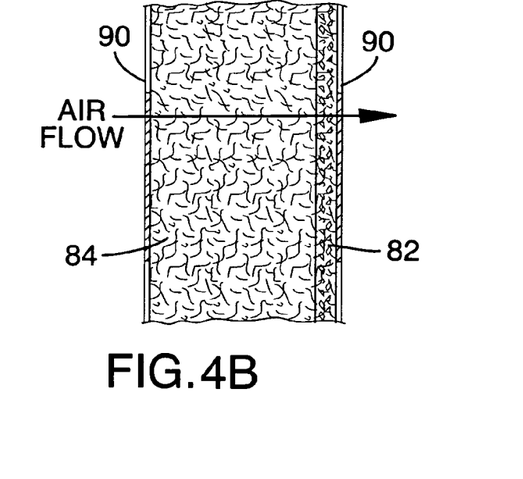
FIG. 4B is an elevational section along the line indicated in FIG. 4A.

As shown in FIGS. 4A–4B, an exemplary embodiment of the gas-filter assembly 34 comprises a filter frame 80, a dual-media filter element 82, and a pre-filter 84, and is made by Filtration Group, Inc., Joliet, Ill. The gas-filter assembly 34 is mounted, with the major dimension extending vertically, between the rear panel 20 and the louver panel 36 such that air passes through the pre-filter 84 before passing through the dual-media filter element 82.

The pre-filter 84 desirably is configured as a non-woven, spun-fiber open matrix having interstitial spaces sized and configured so as to impose very low flow resistance to air passing through the pre-filter. In a particular embodiment, the fibers in the pre-filter 84 are of spun polypropylene. Alternatively, any of various other spun polymeric or glass fibers, for example, or mixtures of such fibers could be used. The primary role of the pre-filter 84 is to remove large, particulate matter from air passing through the pre-filter, so as to prevent such matter from clogging the downstream dual-media filter element 82 and to extend the life of the E3D filter assemblies 42a, 42b. By way of example, the pre-filter is approximately ⅜-inch to ½-inch thick and blocks passage therethrough of airborne particles that are 20 micrometers or larger, which is effective for removing hair, lint aggregates, and other large particulate matter from the air propagating toward the dual-media filter element 82.

Figures 5, 6, 7:
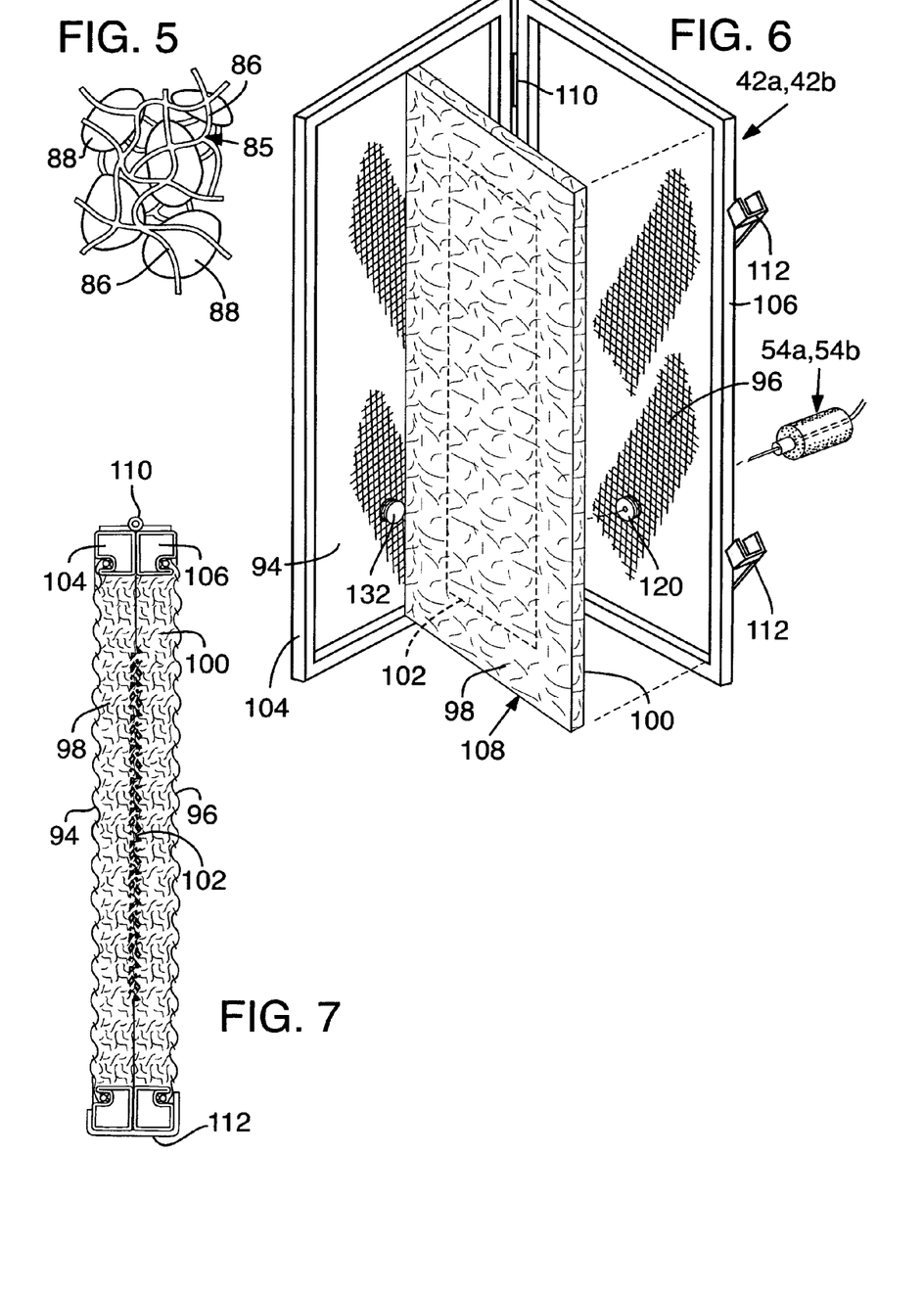
FIG. 5 depicts a magnified view of activated-carbon particles enmeshed in the fiber matrix of the dual-media filter element of the gas-filter assembly.
FIG. 6 is an elevational perspective view depicting the manner in which the dielectric filters and charging element are sandwiched between upstream and downstream screens in the electrostatic 3-dimensional (E3D) filter assemblies.
FIG. 7 is a transverse section through an E3D filter assembly.

The dual-media filter element 82 is a three-dimensional matrix (exemplary thickness is 3/16 inch) of non-woven fibers and functional particles that are adhered to the fibers. The particles are adhered to the fibers without using an extraneous binder or adhesive but rather by the fibers themselves. The non-woven fibers desirably are of a "bicomponent" type, comprising a high-strength core and a low-melt sheath. The functional particles desirably are activated carbon (also termed "activated charcoal"). A particularly advantageous filter element of this type is an "AQF®" filter element manufactured by AQF Technologies LLC, Charlotte, N.C. As shown in FIG. 5, the bicomponent fibers 86 form a non-woven, generally uniform web 85 of interconnected fibers that are thermally bonded to each other by localized fusing of the low-melt sheaths at points of contact of the fibers. Also, the functional particles 88 are thermally bonded (by the low-melt sheath) to the fibers 86 at respective points of contact of the fibers 86 with the particles 88. Thus, the functional particles 88 are strongly bonded to the web 85 and distributed three-dimensionally throughout the web 85. The bonding of the functional particles 88 to the web 85 prevents migration of the particles 88 out of the web 85. In addition, bonding of the particles 88 to the fibers 86 is achieved without substantially reducing the surface area of the particles 88 available for interaction with air. In other words, the effective surface area of the particles 88 in the web 85 is not substantially reduced by bonding of the particles 88 to the fibers 86, which allows the dual-media filter element 82 to exhibit much greater VOC-removal efficiency than conventional activated-carbon filters. Consequently, less activated-carbon material is required, which reduces the pressure drop across the dual-media filter element 82, which permits improved air flow at a lower applied pressure. This, in turn, allows the fans 48a–48c to be reduced in size and flow rate, which lowers air turbulence, which reduces air noise. A dual-media filter element is discussed in U.S. Pat. No. 5,486,410 to Groeger et al., incorporated herein by reference.

The filter frame 80 can be made inexpensively of cardboard or the like, or other suitable material offering comparable strength and rigidity. The filter frame 80 desirably includes struts 90 that extend on both sides of the frame. The dual-media filter element 82 and pre-filter 84 are placed together superposedly and held in intimate contact with each in this manner by being mounted in the filter frame 80.

The gas-filter assembly 34 effectively removes not only many types of large particles (e.g., hair, lint, visible dust) but also gases and volatile organic compounds (VOCs) from the air. Exemplary VOCs include, but are not limited to, formaldehyde, nicotine, acrolein, benzene, valeraldehyde, 4-methyl-2-pentanone, toluene, n-butyl acetate, tetrachloroethylene, styrene, α-pinene, 1,4-dichlorobenzene, d-limonene, and 2-butoxyethanol. Thus, the gas-filter assembly 34 is effective in reducing common room odors such as pet smells, tobacco smoke, and cooking odors.

In a typical embodiment subjected to normal-use conditions, the gas-filter assembly 34 should be replaced after it has been used for the prescribed length of time (e.g., 6 months). Desirably, the bottom edge of the louver panel 36 is provided with one or more latch clips (not shown) that can be released by an operator to allow the expired gas-filter assembly 34 to be removed for disposal. To facilitate ease of removal of the gas-filter assembly, a pull tab 81 is attached to the filter frame 80.

Electrostatic 3-Dimensional Filter Assembly

The electrostatic 3-D (E3D) filter assemblies 42a, 42b are located fluidically downstream of the gas-filter assembly 34. Although the representative embodiment depicted herein includes two E3D filter assemblies 42, 42b, only one or more than two alternatively can be used. In the depicted embodiment, the E3D filter assemblies 42a, 42b are mounted adjacent each other, with each one's major dimension oriented vertically. Desirably, the two E3D filter assemblies 42a, 42b are oriented in a book-like manner as shown (see FIG. 3) so as to partially face the UV lamp tube 44. Certain aspects of an E3D filter assembly 42a, 42b are discussed in U.S. Pat. No. 5,108,470 to Pick and U.S. Pat. No. 4,886,526 to Joannou, both incorporated herein by reference. Filter assemblies of this type can be obtained from Environmental Dynamics Group, Princeton, N.J.

Turning now to FIGS. 6 and 7, each E3D filter assembly 42a, 42b in the representative embodiment comprises an upstream electrically conductive screen 94, a downstream electrically conductive screen 96, upstream and downstream dielectric filters 98, 100, respectively (sandwiched between the screens 94, 96), and an electrically conductive charging element 102 sandwiched between the dielectric filters 98, 100. Each screen 94, 96, in a manner similar to a window screen, desirably is made of woven metal (e.g., aluminum) wires, which can be dielectric-coated if desired. Each screen 94, 96 is mounted peripherally in a respective electrically conductive frame 104, 106, respectively. The frames 104, 106 can be made, e.g., of the same metal used to make the screens 94, 96. Each dielectric filter 98, 100 desirably is configured as a non-woven, continuous-filament, spun-fiber matrix having interstitial spaces sized and configured so as to impose very low flow resistance to air passing through the respective filter. Desirably, the fibers in each of the dielectric filters 98, 100 are spun glass, but any of various other dielectric fibers can be used instead. An exemplary thickness of each dielectric filter 98, 100 is ¼ to ⅜ inch. The charging element 102 can be, for example, an open-celled dielectric foam or non-woven matrix of dielectric fibers coated and/or impregnated with fine carbon (graphite or finely powdered charcoal) so as to make the charging element 102 electrically conductive. An exemplary thickness of the charging element 102 is 1/16 to 1/8 inch.

As shown in FIG. 7, the charging element 102 in the depicted embodiment is sandwiched between the dielectric filters 98, 100. The length and width dimensions of the charging element 102 desirably are one to two inches less than corresponding dimensions of the dielectric filters 98, 100 (see FIG. 6), such that, while sandwiched, the charging element 102 is centered relative to and isolated inside the dielectric filters 98, 100. The charging element 102 desirably is immobilized between the dielectric filters 98, 100 in the filter "sandwich" 108 (FIG. 6) by applying a suitable adhesive (e.g., a hot-melt adhesive) at least peripherally to the facing sides of the dielectric filters to form an integrated unit. Thus, the charging element 102 is suspended in all three of the length, width, and thickness dimensions by the dielectric filters 98, 100. The sandwich 108 is interposed between the screens 94, 96 to form the respective E3D filter assembly 42a, 42b.

Desirably, in each E3D assembly 42a, 42b, the respective screen frames 104, 106 are mounted to each other along respective longitudinal sides by hinges 110 (FIG. 6). Thus, the frames 104, 106 can be opened in the manner of a book for easy removal or insertion of a filter sandwich 108. On at least one of the frames 104 are mounted latches 112. For use, the frames 104, 106 (with a filter sandwich 108 interposed between the respective screens 94, 96) are closed and held together firmly using the latches 112. Desirably, one of the frames 104, 106 of each E3D filter assembly 42a, 42b is mounted to posts 115 extending rearwardly from the intermediary portion 19 of the housing 14 (see FIG. 3), leaving the other frame free to pivot on the hinges 110 whenever the latches 112 are opened.

Figure 8:
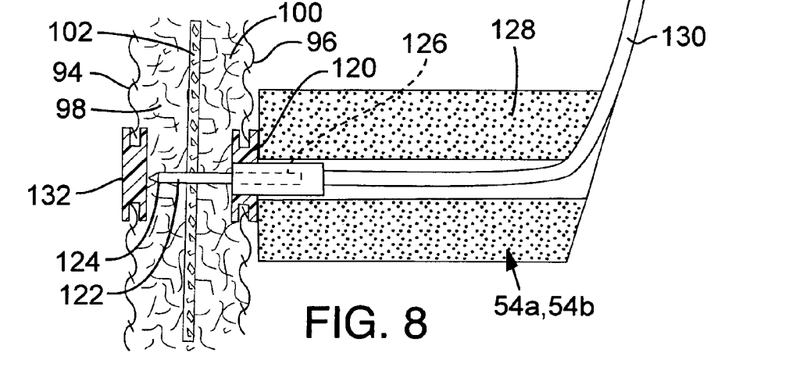
FIG. 8 is a transverse section through a high-voltage probe and a portion of the corresponding E3D filter assembly.

With respect to each E3D filter assembly 42a, 42b, to energize the charging element 102 electrically without charging the screens 94, 96, a respective high-voltage probe 54a, 54b is used. As shown in FIG. 8, each high-voltage probe 54a, 54b comprises an electrically insulative (e.g., plastic) flange 120 and electrical conductor 122 (made, e.g., of titanium) extending axially through the flange 120. The distal end of the conductor 122 terminates in a pointed tip 124, and the opposite end of the conductor 122 serves as a connector pin 126. The probe 54a, 54b is mounted to the intermediary portion 19 via a compliant mounting such as a closed-cell foam cylinder 128, which orients the conductor 122 at a normal angle toward the respective E3D filter assembly 42a, 42b. Specifically, the cylinder 128 positions the flange 120 so as to contact the downstream screen 96 whenever the screen is mounted to the intermediary portion 19. The conductor 122 has a length that allows the tip 124, when properly positioned, to penetrate the downstream dielectric filter 100 and contact the charging element 102 without extending significantly into the upstream dielectric filter 98. Meanwhile, the connector pin 126 of the conductor 122 is connected to a wire 130 from the high-voltage transformer 50. To ensure proper penetration of the probe tip 124, a button 132 is mounted to the upstream screen 94. Whenever the frames 104, 106 of the screens 94, 96, respectively, are latched together at the time of mounting a fresh filter sandwich 108 between the screens 94, 96, the operator presses the button 132 (which is made of a suitable rigid dielectric such as a rigid plastic) directly toward the respective probe 54a, 54b. Depression of the button 132 is sufficient to collapse the upstream dielectric filter 98 locally until the button 132 actually is urged against the probe tip 124, thereby achieving penetration of the probe tip 124 through the downstream dielectric filter 100 and into the thickness dimension of the charging element 102. Upon releasing the button 132, the upstream dielectric filter 98 returns to full thickness. With the probe tip 124 positioned in this manner, electrical charging of the screens 94, 96 is prevented.

As noted, during use, the probes 54a, 54b are connected to a secondary winding of the high-voltage transformer 50. The transformer 50 is part of an electrical circuit (not shown but understood in the art) that converts 110 VAC line voltage (supplied by the power cord 30) to approximately −6000 VDC at very low current. In an exemplary embodiment, the transformer 50 is a type CS2080A3, obtained from High Voltage Power Systems, Inc., Carrollton, Tex., and having a nominally 120 VAC input and nominally −6 KVDC output as rectified by an integral rectifier and filter. This high negative voltage is connected by the probes 54a, 54b to the respective charging elements 102 in the E3D filter assemblies 42a, 42b. Meanwhile, the screens 94, 96 and their respective frames 104, 106 are electrically grounded, thereby placing the charging elements 102 at a −6000 VDC electrostatic potential relative to the screens and frames. The dielectric filters 98, 100 are not directly charged. However, being dielectric and in close proximity to the charging element 102, the fibers of the dielectric filters 98, 100 acquire various electrostatic polarized charges proximally from the charging element 102 being at −6000 VDC and from charged particles adhering to the fibers.

The E3D filter assemblies 42a, 42b rely upon at least three principles to trap airborne dust particles: impingement, polarization, and agglomeration. Impingement is the entrapment of an airborne particle that occurs as the particle impacts and becomes attached to a fiber of one of the dielectric filters 98, 100 or of the charging element 102. However, filtration by impingement represents a very small contribution to the overall filtration effectiveness of the E3D filter assembly. Polarization is a phenomenon that occurs when airborne particles as well as the fibers of the filters 98, 100 are in close proximity to the electrostatically charged charging element 102. Under such conditions, locations on dust particles and on the fibers become charged by being closely proximal to the applied electrostatic charge. According to the principles of electrostatic attraction (between opposite charges) and repulsion (between like charges), airborne particles entering the E3D filter assembly 42a, 42b acquire localized charges themselves and are attracted to oppositely charged regions on proximal regions of the dielectric filters 98, 100 and charging element 102. Because the effects of electrostatic attraction and repulsion act over distances, the particle-collecting effectiveness of each fiber of the filters 98, 100 is increased many times over the effectiveness of an otherwise similarly configured but uncharged fiber. In other words, many more dust particles are influenced by a single fiber of a filter 98, 100 when the fiber is electrically polarized versus when it is not polarized. This allows the E3D filter assembly 42a, 42b to be configured with a very low pressure drop (and hence very low flow resistance) while exhibiting excellent removal of particles from the air passing through the assembly.

Since polarized particles from the air remain polarized only so long as they are being influenced by a static charge, if any such particles leave the E3D filter assembly, they carry no residual charge and thus are free to be captured on a subsequent pass through the air-treatment unit 10. Also, because the particles leaving the E3D filter assembly 42a, 42b are uncharged, they are not electrostatically attracted to other surfaces in the room, for example, which allows the particles to be captured by the air-treatment unit 10 later.

The third principle is agglomeration. As discussed above, as airborne particles enter the air-treatment unit 10, they become polarized by the E3D filter assemblies 42a–42b. This causes the particles to behave as individual airborne miniature magnets. As a result: (a) the particles are attracted to and captured on oppositely polarized fibers or regions of the E3D filter assemblies 42a, 42b, (b) the particles strike or are attracted to each other, causing self-adhesion and formation of larger particles ("agglomeration"), which are more easily captured by the air-treatment unit 10, (c) the agglomerated particles can pass through the E3D filter assemblies 42a, 42b, but because they are now larger particles (as a result of agglomeration), the particles can be captured on a subsequent pass, and (d) the dust particles may pass unchanged and uncharged through the air-treatment unit 10, which leaves them available for charging, agglomeration, and/or capture on a subsequent pass.

Operation

The representative embodiment of the air-treatment unit 10 is configured to operate on normal household AC current (115 VAC in the U.S.). Power is supplied to the air-treatment unit 10 by the power cord 30, which provides power for the fans 48a–48c, the power electronics board 52, the control and display panel 28, and the primary winding of the high-voltage transformer 50. The high-voltage transformer 50 includes a rectifier and filter on its secondary winding to produce the −6000 VDC output to the high-voltage probes 54a, 54b. The power on-off button 58 on the control and display panel 28 turns the air-treatment unit 10 ON and OFF. Whenever the air-treatment unit 10 is OFF, the fans 48a–48c are not running, the UV lamp tube 44 is off, and no power is being applied to the high-voltage transformer 50. Upon turning the air-treatment unit 10 ON, the fans run at the previously set fan speed. If the air-treatment unit 10 had been unplugged during the time it was OFF, the fans 48a–48c will operate at a default speed of "3" (the median speed) when the air-treatment unit 10 is turned back ON.

Figure 10:
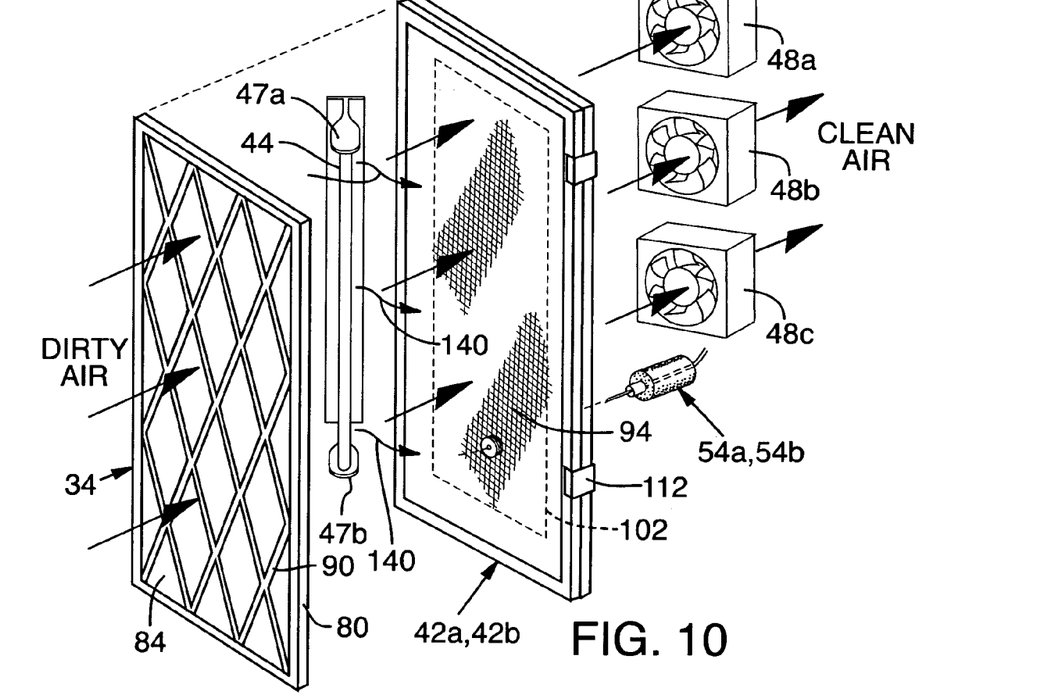
FIG. 10 is a perspective drawing conceptually showing the passage of air through the filter assemblies and fans inside the housing of the representative embodiment.

Referring now to FIG. 10, whenever the air-treatment unit 10 is ON, "dirty" air enters and passes first through the gas-filter assembly 34 (passing first through the pre-filter 84 and then through the dual-media filter element 82). As the air passes through the gas-filter assembly 34, the pre-filter 84 traps lint, hair, and other large airborne particles, and the dual-media filter element 82 removes VOC contaminants (small, volatile organic compounds of some contaminant gases and many odors) as well as some particulates. (Small particles such as particles of soot, smoke, bacteria, and mold generally pass through the gas-filter assembly 34, but many of these particles are captured by the downstream E3D filter assemblies.) The air exiting the dual-media filter element 82 passes by the UV lamp tube 44 and enters the E3D filter assemblies 42a, 42b. As the air enters the E3D filter assemblies 42a, 42b, many small particles and microorganisms entrained in the air are captured by the upstream dielectric filters 98. Meanwhile, the UV lamp tube 44 continuously irradiates the upstream dielectric filters 98 and screens 94 with germicidal UV light 140 and thus kills the microorganisms captured on these upstream surfaces. Also, as the air enters the E3D filter assemblies 42a, 42b, particles entrained in the air are polarized and thus are highly attracted to the fibers of the filter sandwich 108. As a result of these actions, air exiting the E3D filter assemblies 42a, 42b is substantially cleaner than upstream air. This "clean" air is discharged from the air-treatment unit 10 via the fans 48a–48c.

Except as specifically noted, the various components of the air-treatment unit 10 can be made of any of various suitable materials. In a specific implementation, and by way of example, the base 12 and various panels of the housing 14 are made of a rigid polymeric plastic such as polycarbonate or UV-stabilized ABS.

It will be understood that the appended claims are not limited to the representative embodiments disclosed herein, but rather encompass all modifications, alternatives, and equivalents that are within the spirit and scope of the following claims.

What is claimed is:

1. An air-treatment apparatus, comprising:
   a housing enclosing an interior space, the housing defining an air-intake opening through which air enters the interior space for treatment, and an air-output opening through which treated air exits the interior space;
   a gas-filter assembly situated within the interior space so as to receive air entering through the air-intake opening, the gas-filter assembly being permeable to air-flow therethrough and comprising a dual-media filter element, the dual-media filter element comprising a matrix of fibers to which particles of activated carbon are adhered at mutual points of contact without using an extraneous binder, the particles of activated carbon being configured to adsorb compounds including volatile organic compounds from the air as the air passes through the gas-filter assembly; and
   at least one electrostatic 3-dimensional (E3D) filter assembly situated within the interior space downstream of the gas-filter assembly so as to receive and pass air that has passed through the gas-filter assembly, each E3D filter assembly comprising a respective charging element sandwiched between respective dielectric-fiber filters that are sandwiched between two respective electrically conductive screens that are electrically grounded, the charging element being electrically conductive and being connected to a source of high-voltage DC power so as to impose electrical potentials on the fibers of the dielectric-fiber filters sufficient to polarize and attract particles in the air passing through the at least one E3D filter assembly.

2. The apparatus of claim 1, wherein the gas-filter assembly further comprises a pre-filter located upstream of the dual-media filter element to receive air entering through the air-intake opening, the pre-filter comprising a network of fibers configured to remove large particulates from the air as the air passes through the pre-filter.

3. The apparatus of claim 2, wherein the gas-filter assembly further comprises a frame peripherally surrounding the pre-filter and the dual-media filter element arranged superposedly, with the pre-filter situated upstream of the dual-media filter element.

4. The apparatus of claim 3, wherein the frame further comprises a pull tab for use in removing the gas-filter assembly from the interior space.

5. The apparatus of claim 1, wherein, in the gas-filter assembly, the fibers of the dual-media filter element comprise bicomponent fibers arranged as a non-woven matrix in which the fibers are bonded to each other at mutual points of contact without using an extraneous binder.

6. The apparatus of claim 1, further comprising at least one fan situated and configured to urge a flow of air through the air-intake opening into the interior space, through the gas-filter assembly, and through the E3D filter assembly, and to exit the interior space through the air-output opening.

7. The apparatus of claim 6, wherein the at least one fan is located downstream of the E3D filter assembly, between the E3D filter assembly and the air-output opening.

8. The apparatus of claim 7, comprising multiple fans that operate in parallel to urge the flow of air.

9. The apparatus of claim 1, further comprising a UV lamp situated and configured to illuminate an upstream surface of the at least one E3D filter assembly.

10. The apparatus of claim 9, wherein the UV lamp produces a germicidal wavelength of UV light sufficient to kill microorganisms captured on the upstream surface as the air flows through the at least one E3D filter assembly.

11. The apparatus of claim 10, wherein the germicidal wavelength does not include an ozone-generating wavelength of UV light.

12. The apparatus of claim 11, wherein the UV light produced by the UV lamp includes 254-nm light but not 185-nm UV light.

13. The apparatus of claim 10, wherein:
   at least two E3D filter assemblies are provided inside the housing; and
   the UV lamp is situated between the E3D filter assembly in a manner allowing the UV lamp to illuminate UV light on respective upstream surfaces of each of the E3D filter assemblies.

14. The apparatus of claim 1, wherein:
   the interior space comprises a first space and a second space; and
   the first space is situated between the gas-filter assembly, and the second space is situated between the at least one E3D filter assembly and the air-output opening, such that the air flows from the gas-filter assembly through the first space to the at least one E3D filter assembly, and from the at least one E3D filter assembly through the second space to the air-outlet opening.

15. The apparatus of claim 1, wherein, in the at least one E3D filter assembly the charging element comprises a network of dielectric fibers coated with an electrically conductive layer of carbon.

16. The apparatus of claim 1, wherein the high-voltage DC power is a negative DC voltage.

17. The apparatus of claim 1, wherein:
in the at least one E3D filter assembly the charging element is connected to the high-voltage source of DC power via a probe assembly; and
the probe assembly comprises a conductive pin mounted in a dielectric holder configured to extend the conductive pin through one of the dielectric-fiber filters to the charging member without shorting the DC power to the respective grounded screen.

18. The apparatus of claim 1, wherein, in the at least one E3D filter assembly the dielectric-fiber filters are bonded to the charging element so as to surround the charging element and form a particle-filter unit.

19. The apparatus of claim 1, wherein each of the dielectric-fiber filters comprises a respective non-woven matrix of spun-glass fibers.

20. The apparatus of claim 1, wherein in the E3D filter assembly each conductive screen is peripherally mounted to a respective frame.

21. The apparatus of claim 20, wherein the respective frames are electrically conductive and connected to electrical ground.

22. The apparatus of claim 21, wherein the frames are hinged to each other to allow the respective screens to be opened for insertion and removal of the respective dielectric-fiber filters and charging member.

23. The apparatus of claim 1, wherein the at least one E3D filter assembly treats air flowing therethrough by impingement of particles from the air, by polarization of particles in the air so as to produce electrical charges on the particles by which the particles are attracted to the fibers of the dielectric-fiber filters, and by agglomeration of particles to each other that have acquired electrical charges while being polarized.

24. The apparatus of claim 1 wherein:
the housing has a front and a rear;
the air-intake opening is defined in the rear of the housing; and
the air-output opening is defined in the front of the housing, facing a space in which the air is to be treated using the apparatus.

25. An air-treatment apparatus, comprising:
housing means enclosing an interior space, said housing means defining air-intake-opening means for allowing passage of air into the interior space for treatment in the interior space, and air-output-opening means for allowing treated air to exit the interior space;
gas-filter means, situated within the interior space, for receiving air entering through said air-intake-opening means, said gas-filter means comprising dual-media-filter means including a matrix of fibers and particles of activated carbon adhered to the fibers of the matrix at mutual points of contact without using an extraneous binder, the particles of activated carbon being configured to adsorb compounds including volatile organic compounds from the air as the air passes through said gas-filter means; and
at least one electrostatic 3-dimensional (E3D) filter means situated within the interior space downstream of the gas-filter means so as to receive and pass air that has passed through the gas-filter means, each E3D filter means comprising respective charging-element means sandwiched between respective dielectric-fiber-matrix means that are sandwiched between respective electrically grounded screen means, said charging-element means being electrically conductive and being connected to a source of high-voltage DC power so as to impose electrical potentials on fibers of the dielectric-fiber-matrix means sufficient to polarize and attract particles in the air passing through the at least one E3D filter means.

26. The apparatus of claim 25, further comprising UV-irradiation means for irradiating an upstream surface of the E3D filter means with a wavelength of UV light that is germicidal to microorganisms trapped on said upstream surface.

27. The apparatus of claim 25, further comprising air-movement means for urging the passage of air.

28. The apparatus of claim 25, wherein the gas-filter means includes pre-filter means, situated upstream of the dual-media-filter means, for removing large particulate matter from air, passing through said gas-filter means, before the air reaches said dual-media-filter means.

29. An apparatus for treating air, comprising:
a housing enclosing an interior space, the housing defining an air-intake opening through which air enters the interior space for treatment, and an air-output opening through which treated air exits the interior space;
a gas-filter assembly situated within the interior space so as to receive air entering through the air-intake opening, the gas-filter assembly being permeable to air-flow therethrough and comprising an upstream pre-filter and a downstream dual-media filter element, the pre-filter comprising a matrix of fibers sufficient for removing large particulate matter from air passing through the pre-filter, the dual-media filter element comprising a matrix of fibers to which particles of activated carbon are adhered at mutual points of contact without using an extraneous binder, the particles of activated carbon being configured to adsorb compounds including volatile organic compounds from the air as the air passes through the dual-media filter element;
at least one electrostatic 3-dimensional (E3D) filter assembly situated within the interior space downstream of the gas-filter assembly so as to receive and pass air that has passed through the gas-filter assembly, each E3D filter assembly comprising a respective charging element sandwiched between two respective dielectric-fiber filters that are sandwiched between two respective electrically conductive screens that are electrically grounded, the charging element comprising a porous matrix coated with electrically conductive carbon and being electrically connected to a source of high-voltage DC power so as to electrically charge the charging element and thus impose electrical potentials on the fibers of the dielectric-fiber filters sufficient to polarize and attract particles in the air passing through the at least one E3D filter assembly;
a UV lamp situated and configured to illuminate a respective upstream surface of the at least one E3D filter assembly with UV light comprising a germicidal wavelength but not an ozone-generating wavelength; and
at least one fan situated and configured to urge a flow of air into the air-intake opening, through the gas-filter assembly, past the UV lamp, through the at least one E3D filter assembly, and out through the air-output opening.

30. The apparatus of claim 29, wherein at least one fan is situated between the at least one E3D filter assembly and the air-output opening.

31. A method for treating air, comprising:
removing volatile organic compounds from the air by passing the air through a dual-media filter element including a matrix of fibers to which particles of activated carbon are adhered at mutual points of contact without using an extraneous binder;

after passing the air through the dual-media filter element, removing particulate matter and microorganisms from the air by passing the air through an electrostatic 3-dimensional (E3D) filter assembly comprising an air-permeable, electrically conductive charging element sandwiched between upstream and downstream dielectric-fiber filters that are sandwiched between upstream and downstream electrically conductive screens that are electrically grounded, while the charging element is being energized with high-voltage DC power so as to impose electrical potentials on the fibers of the dielectric-fiber filters, thereby causing the fibers to polarize and attract particles in the air passing through the E3D filter assembly; and while passing the air through the E3D filter assembly, irradiating the upstream screen and upstream dielectric-fiber filter of the E3D filter assembly with a germicidal wavelength of UV light so as to kill microorganisms trapped on said screen and filter.

32. The method of claim 31, further comprising irradiating the air with the germicidal wavelength of UV light as the air passes from the dual-filter media element to the E3D filter assembly.

33. The method of claim 31, further comprising, before passing the air through the dual-media filter element, passing the air through a pre-filter to remove the large particulate matter from the air before the air reaches the dual-media filter element.

34. The method of claim 31, wherein, in the irradiating step, the germicidal wavelength of UV light does not include an ozone-generating wavelength of UV light.

35. The method of claim 31, further comprising actively urging flow of the air through the dual-media filter assembly and the E3D filter assembly.

36. The method of claim 35, wherein the air is urged at a selected velocity through the dual-media filter and the E3D filter assembly.

37. The method of claim 31, wherein, as the air is passed through the E3D filter assembly, particles in the air are removed by a combination of impingement, polarization, and agglomeration of the particles as performed by the E3D filter assembly.

38. A method for treating air, comprising:

providing a housing defining an interior space, an air-intake opening, and an air-output opening;

situating in the interior space a dual-media filter element relative to the air-intake opening so as to receive air from the air-intake opening, the dual-media filter element including a matrix of fibers to which particles of activated carbon are adhered at mutual points of contact without using an extraneous binder;

situating in the interior space an electrostatic 3-dimensional (E3D) filter assembly relative to the dual-media filter element and air-output opening so as to receive air from the dual-media filter element and to discharge air, passing through the E3D filter assembly, through the air-outlet opening, the E3D filter assembly comprising an air-permeable, electrically conductive charging element sandwiched between upstream and downstream dielectric-fiber filters that are sandwiched between upstream and downstream electrically conductive screens that are electrically grounded, while the charging element is being energized with high-voltage DC power so as to impose electrical potentials on the fibers of the dielectric filters that cause the fibers to polarize and attract particles in the air passing through the E3D filter assembly;

introducing air into the interior space through the air-intake opening;

removing volatile organic compounds from the air by passing the introduced air through the dual-media filter element;

after passing the air through the dual-media filter element, removing small particulate matter and microorganisms from the air by passing the air through the E3D filter assembly; and while passing the air through the E3D filter assembly, irradiating the upstream screen and upstream dielectric-fiber filter of the E3D filter assembly with a germicidal wavelength of UV light so as to kill microorganisms trapped on said screen and filter.

39. The method of claim 38, further comprising irradiating the air with the germicidal wavelength of UV light as the air passes from the dual-filter media element to the E3D filter assembly.

40. The method of claim 38, further comprising, before passing the air through the dual-media filter element, passing the air through a pre-filter to remove large particulate matter from the air before the air reaches the dual-media filter element.

41. The method of claim 38, wherein, in the irradiating step, the germicidal wavelength of UV light does not include an ozone-generating wavelength of UV light.

42. The method of claim 38, further comprising the steps of:

providing in the interior space at least one fan situated and configured to urge flow of air whenever the fan is running; and running the at least one fan in a manner that urges flow of air into the housing through the air-intake opening, through the dual-media filter assembly, through the E3D filter assembly, and out of the housing through the air-outlet opening.

43. The method of claim 42, wherein the at least one fan is run at a selected velocity.

* * * * *